United States Patent
Scholz et al.

(10) Patent No.: US 7,202,423 B2
(45) Date of Patent: Apr. 10, 2007

(54) APPARATUS FOR WEIGHING OUT THE REMAINING QUANTITY OF A SUBSTANCE IN A STORAGE VESSEL

(75) Inventors: Christoph Scholz, Waakirchen (DE); Christoph Frank, Goldach (DE); Eckard Kopatzki, Ismaning (DE)

(73) Assignee: CS Clean Systems AG, Ismaning (DE)

( * ) Notice: Subject to any disclaimer, the term of this patent is extended or adjusted under 35 U.S.C. 154(b) by 275 days.

(21) Appl. No.: 10/922,132

(22) Filed: Aug. 19, 2004

(65) Prior Publication Data
US 2005/0039955 A1 Feb. 24, 2005

(30) Foreign Application Priority Data
Aug. 20, 2003 (DE) ................ 103 38 290

(51) Int. Cl.
*G01G 21/28* (2006.01)
(52) U.S. Cl. .................................... 177/180
(58) Field of Classification Search ............ 177/56, 177/180, 226, 189, 52–55, 57, 181–182, 177/238–243; 211/87, 97, 90.01; 137/188
See application file for complete search history.

(56) References Cited

U.S. PATENT DOCUMENTS

| | | | | |
|---|---|---|---|---|
| 4,254,521 A | * | 3/1981 | Papmahl | 441/4 |
| 4,541,596 A | * | 9/1985 | Price | 248/125.8 |
| 4,614,245 A | * | 9/1986 | Yamanaka | 177/210 FP |
| 5,551,309 A | | 9/1996 | Goossens et al. | |
| 5,622,344 A | * | 4/1997 | Gracie | 248/171 |
| 5,797,501 A | * | 8/1998 | Von Gunten | 211/90.01 |
| 6,121,527 A | * | 9/2000 | Hamm | 84/327 |
| D512,479 S | * | 12/2005 | Hsiao | D23/202 |
| 2003/0047178 A1 | * | 3/2003 | Barth et al. | 126/41 R |

FOREIGN PATENT DOCUMENTS

DE  696 03 629 T2  9/2000

OTHER PUBLICATIONS

Official Action dated Apr. 6, 2004 in German Application No. 013 38 290.9 (2 pages).

* cited by examiner

*Primary Examiner*—Randy W. Gibson
*Assistant Examiner*—Sean Kayes
(74) *Attorney, Agent, or Firm*—Flynn, Thiel, Boutell & Tanis, P.C.

(57) ABSTRACT

Apparatus for weighing out the remaining quantity of a substance in a storage vessel disposed in a cabinet and attached with rigid connecting lines to a valve plate fastened in the cabinet and from which rigid connecting lines lead to a consumer. The apparatus includes at least one load cell on which the storage vessel is set down, and a stand is provided having fastened thereto a platform provided with the load cell. The stand is set down on the cabinet floor and/or suspended on a cabinet wall, and the valve plate is fastened to the stand.

20 Claims, 2 Drawing Sheets

APPARATUS FOR WEIGHING OUT THE REMAINING QUANTITY OF A SUBSTANCE IN A STORAGE VESSEL

This invention relates to an apparatus for weighing out the remaining quantity of a substance in a storage vessel according to the preamble of claim 1.

Such an apparatus is used for example in the production of chips and similar electronic devices by chemical vapor deposition (CVD). The storage vessel contains for this purpose a liquid substance which is supplied to a CVD reactor as the consumer. Since substances of ultra-high purity must be used for these processes, rigid connecting lines of high-grade steel are used. The liquid substances, generally organic metal and semimetal compounds, are usually extremely air- and moisture-sensitive, frequently explosive. The storage vessel must therefore be kept in a cabinet which can e.g. be flushed with inert gas.

An apparatus according to the preamble of claim 1 is known from DE 6960362972. The load cell is formed by a scale here. For determining the remaining quantity in the storage vessel, the storage vessel stands on the scale on the floor of the cabinet in the known apparatus. The storage vessel together with the valve plate and the rigid connecting lines form a rigid system fastened to the cabinet. Due to temperature fluctuations and mechanical influences, warping of the cabinet and thus the cabinet floor is unavoidable. The pressure with which the storage vessel is urged against the cabinet floor and thus the scale then no longer corresponds to the weight of the storage vessel, so that the precision of the known apparatus for determining the remaining quantity of substance in the storage vessel leaves something to be desired.

The problem of the invention is to provide a simply constructed apparatus with which the remaining quantity of substance in such a storage vessel can be precisely determined.

This is achieved according to the invention by the apparatus characterized in claim 1. Advantageous embodiments of the inventive apparatus are stated in the sub-claims.

According to the invention, there is provided a stand or holding device with a platform on which the storage vessel is set down. For weighing out the storage vessel, at least one load cell is located on the platform. The stand at the same time has fastened thereto the valve plate which is connected via rigid connecting lines to the storage vessel, on the one hand, and via rigid connecting lines to the consumer, on the other hand. The stand is merely set down for example on the floor of the cabinet, preferably at at least three points.

If the rigid system comprising storage vessel, stand with platform and valve plate and the rigid connecting lines is moved upward or downward relative to the cabinet due to warping of the cabinet floor, for example, the load cell moves upward or downward on the platform in the same way, i.e. the pressure of the storage vessel on the load cell is decoupled from the motion of the cabinet floor. The same holds when the stand is suspended in the cabinet. The pressure to which the load cell is exposed is thus no longer influenced by warping and similar motions of the cabinet, so that the remaining quantity of substance in the storage vessel can be precisely determined.

As mentioned, the stand can be supported on the cabinet floor at three points. Instead it is also possible to support the stand on the cabinet floor only at one or two points, it then being fastened movably to the cabinet wall, for example by a corresponding guide, so as not to fall over, i.e. to be held in the vertical position.

The stand is preferably formed by a vertical rod, in particular a profile, such as a box-type profile, in order to have the required stiffness.

Since the warp resistance of the cabinet is greatest in the area of its corners, the stand is preferably fastened in the area of the upper corners of the cabinet, if it is suspended on the cabinet wall according to the invention.

To absorb vibrations, the stand has buffers, for example made of rubber-elastic material, at the points where it is supported on the cabinet floor. If the stand is suspended, such a buffer can be provided on the side facing the cabinet wall e.g. in the lower area of the stand.

Only one load cell is preferably provided on the platform, thereby simplifying the signal processing.

The stand, the platform, the valve plate and the connecting lines are preferably made of a material with the same thermal expansion coefficient, so that upon temperature fluctuations no warping can occur to falsify the weighing result. Said material is preferably high-grade steel.

The invention will hereinafter be explained in more detail by way of example with reference to the drawing, in which.

Figure 3:
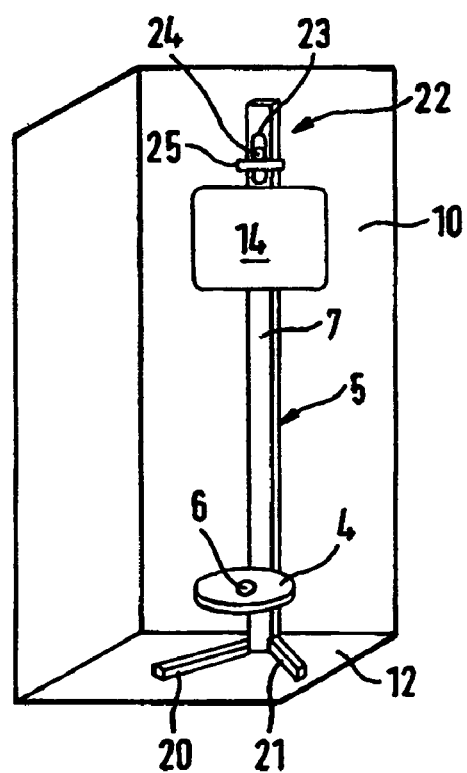

FIG. 3 schematically shows a cabinet according to another embodiment of the inventive apparatus in a perspective view, with one cabinet wall and the upper plate of the cabinet being omitted.

Figure 1:
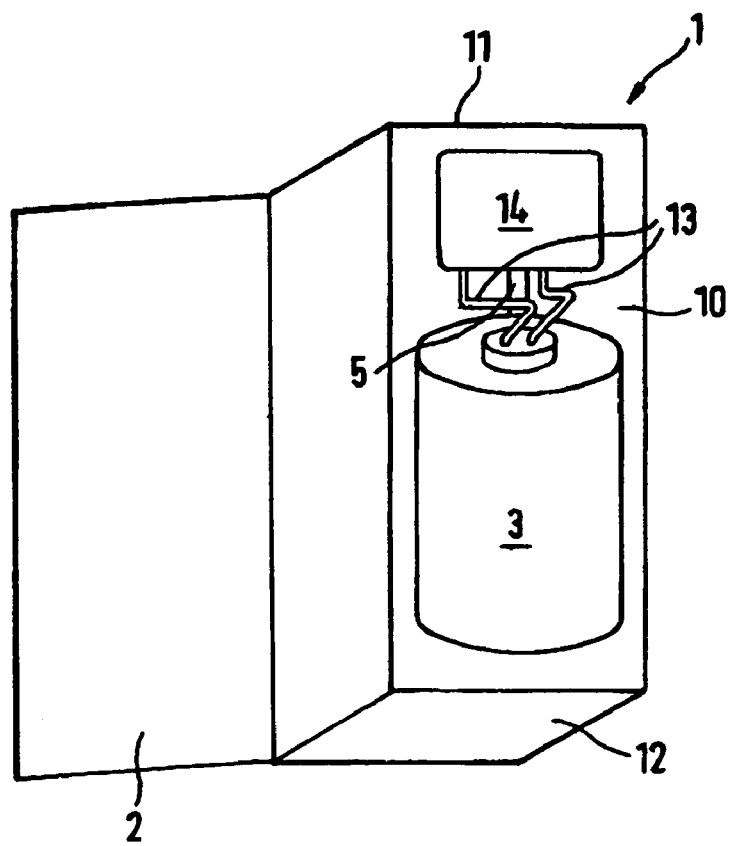
FIG. 1 shows schematically a cabinet according to a first embodiment of the inventive apparatus in a perspective view, with one cabinet wall and the plate on the upper side of the cabinet being omitted.

According to FIG. 1, a storage vessel 3 for a liquid substance is located in a cabinet 1 with a door 2.

Figure 2:
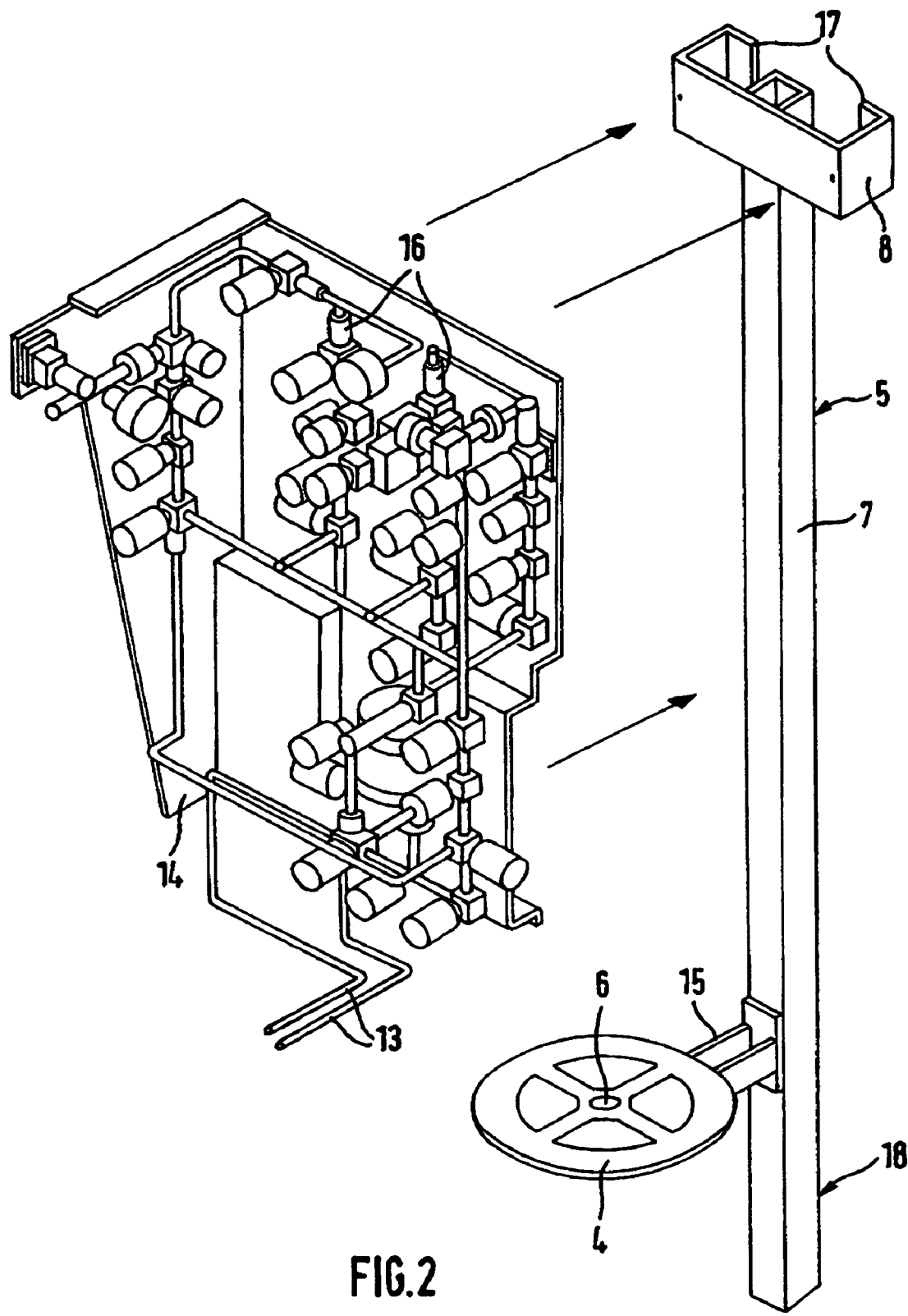
FIG. 2 shows the stand and the valve plate according to FIG. 1.

The storage vessel 3 is set down on a holding device or a stand 5 on a platform 4, the platform 4 being provided in the middle with a load cell 6 (FIG. 2). The stand 5 consists of a vertical rod 7 with a crosspiece 8 at the upper end for fastening the stand 5 to the cabinet wall 10 in the area of the upper cabinet corner 11. The stand 5 is thus suspended on the cabinet wall 10, i.e. the lower end of the rod 7 is disposed at a distance above the cabinet floor 12.

The storage vessel 3 is attached via rigid connecting lines 13 to a valve plate 14 which is fastened to the stand 5 above the storage vessel 3.

According to FIG. 2, the rod 7 is formed by a box-type profile. The platform 4 is fastened to the rod 7 with a holder 15. The platform 4 is shown as a disk in FIG. 2. However, the platform 4 can obviously also be formed differently for receiving the storage vessel 3.

The stand 5, the platform 4, the valve plate 14 and the connecting lines 13 consist of high-grade steel.

The connecting line to the consumer (not shown), for example a CVD reactor, is connectable to the valve plate 14 via coupling pieces 16.

The valve plate 14 is fastened to the rod 7, on the one hand, and to the cross-piece 8, on the other hand, the crosspiece 8 being formed as a stirrup encompassing the rod 7 with inwardly folded ends 17 to be fastened to the cabinet wall 10 for example with screws. At 18 a buffer is provided on the rod 7 for supporting the lower end of the stand 5 on the cabinet wall 10.

The embodiment according to FIG. 3 differs from that according to FIGS. 1 and 2 essentially only in that the stand 7 is merely supported on the cabinet floor 12. For this purpose the stand 7 has two arms 20, 21 at its lower end to form a three point support.

The arms 20, 21 can also be omitted here so that the rod 7 is supported on the cabinet floor 12 only with its lower end. However, then a guide 22 of the stand 5 is required on the cabinet wall 10 for holding the rod 7 in the vertical position, said guide being shown in FIG. 3 in the upper area of the rod 7 by a slot 23 in the rod 7 with a bolt 24 fastened to the cabinet wall 10 protruding therethrough, said bolt being provided with a mount 25 which engages over the slot 23 on the side of the rod 7 facing away from the cabinet wall 10.

The invention claimed is:

1. An apparatus for weighing out a remaining quantity of a substance in a storage vessel which is disposed in a cabinet and attached with rigid connecting lines to a valve plate in the cabinet and from which rigid connecting lines lead to a consumer, having at least one load cell on which the storage vessel is set down, wherein a stand is provided having fastened thereto a platform with the load cell on which the storage vessel can be set down, the stand being set down on the cabinet floor and/or suspended on a cabinet wall, the valve plate being fastened to the stand.

2. An apparatus according to claim 1, wherein the stand is supported on the floor of the cabinet at at least three points.

3. An apparatus according to claim 2, wherein the stand has two arms for support on the cabinet floor.

4. An apparatus according to claim 1, wherein the stand is suspended on the cabinet wall in the area of an upper cabinet corner at at least one point.

5. An apparatus according to claim 4, wherein the stand has a crosspiece at its upper end area for fastening to the cabinet wall.

6. An apparatus according to claim 1, wherein the stand is supported on the cabinet floor at at least one point and mounted at an upper end area to the cabinet wall so that the stand is vertically movable.

7. An apparatus according to claim 1, wherein the stand is formed by a rod.

8. An apparatus according to claim 7, wherein the rod has two arms for support on the cabinet floor at at least three points.

9. An apparatus according to claim 7, wherein the rod has a crosspiece at its upper end area for fastening to the cabinet wall.

10. An apparatus according to claim 1, wherein the stand, the platform, the valve plate and the connecting lines are made of a material with the same thermal expansion coefficient.

11. An apparatus according to claim 1, including coupling pieces connecting the valve plate to the rigid connecting lines leading to a consumer.

12. An apparatus according to claim 11, including at least one buffer disposed on said stand to absorb vibrations at at least one point whereat said stand is supported on the cabinet floor or at a point where said stand is suspended against the cabinet wall.

13. An apparatus according to claim 1, wherein said stand, said platform with said load cell, said valve plate, and said rigid connecting lines are fixed to one another to define a rigid assembly that is decoupled from movement of said cabinet.

14. An apparatus for weighing a substance in a storage vessel in a cabinet comprising:
   a cabinet;
   a stand disposed inside the cabinet;
   a platform secured to the stand for receiving a storage vessel thereon;
   at least one load cell provided with the platform for sensing the weight of a substance in a storage vessel on the platform;
   a valve plate secured to the stand; and
   rigid connecting lines attached at a first end to the storage vessel and attached at a second end to said valve plate,
   wherein said stand, said valve plate, said platform and said rigid connecting lines define a rigid assembly which is movable together in unison so as to be decoupled from movement of said cabinet.

15. An apparatus according to claim 14, wherein said stand is suspended on the cabinet wall.

16. An apparatus according to claim 15, including coupling pieces for connecting the valve plate to rigid connecting lines leading to a consumer.

17. An apparatus according to claim 14, wherein said stand rests on the cabinet floor.

18. An apparatus according to claim 14, wherein said stand comprises a rod.

19. An apparatus according to claim 18, including a guide mounted on the cabinet wall for receiving and supporting said rod while permitting vertical movement of said rod.

20. An apparatus according to claim 19, said guide including a slot for receiving said rod therethrough.

* * * * *